A. & W. BOYNTON.
Saw-Sets.

No. 137,410. Patented April 1, 1873.

Witnesses
Chas. H. Smith
Geo. D. Walker

Inventors
Alfred Boynton
William Boynton
Lemuel W. Serrell
att'y

UNITED STATES PATENT OFFICE.

ALFRED BOYNTON AND WILLIAM BOYNTON, OF BROOKLYN, E. D., NEW YORK, ASSIGNORS TO THEMSELVES AND EBEN M. BOYNTON, OF SAME PLACE.

IMPROVEMENT IN SAW-SETS.

Specification forming part of Letters Patent No. 137,410, dated April 1, 1873; application filed December 10, 1872.

*To all whom it may concern:*

Be it known that we, ALFRED BOYNTON and WILLIAM BOYNTON, of Brooklyn E. D., in the county of Kings and State of New York, have invented an Improvement in Saw-Sets, of which the following is a specification:

The devices heretofore made for setting saws have been employed for bending the alternate teeth successively in one direction, and then, by either reversing the saw or inverting the tool, they have been operated upon to bend the intermediate teeth in the other direction.

Our invention is made for setting both sides of the saw at one time so that all the teeth of the saw, or all within a given length along the saw, will be set at one time and in alternate opposite directions, and by a movement that tends to compress the metal and slightly elongate the tooth so that there will not be any tendency to break the tooth, but the bending action will extend back toward the saw-plate itself.

These objects are accomplished by two jaws, one of which has a rolling action upon journals, and the adjacent surfaces are formed with inclined reverse alternated steps and depressions of a width corresponding to the teeth of the saw to be set; hence the teeth will be all bent for the length of the jaws and set in alternate opposite directions. The jaws are changeable to suit different saws, and adjustable to varying thicknesses of blades.

Figure 1:
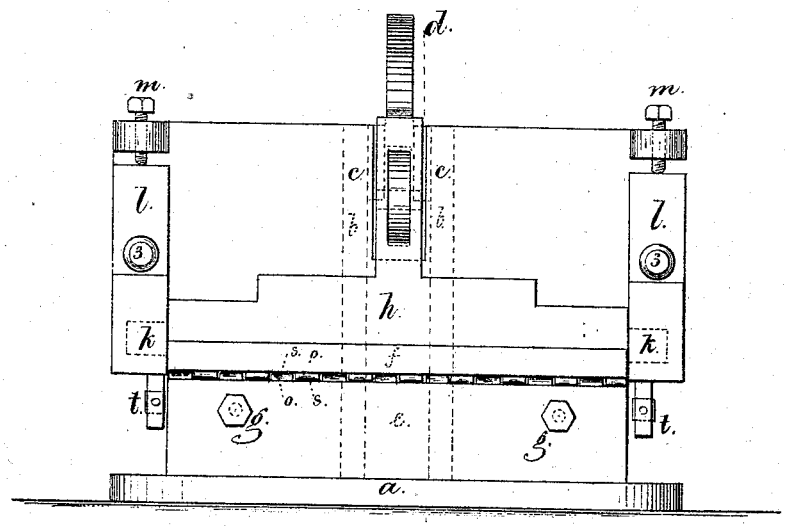
Figure 2:
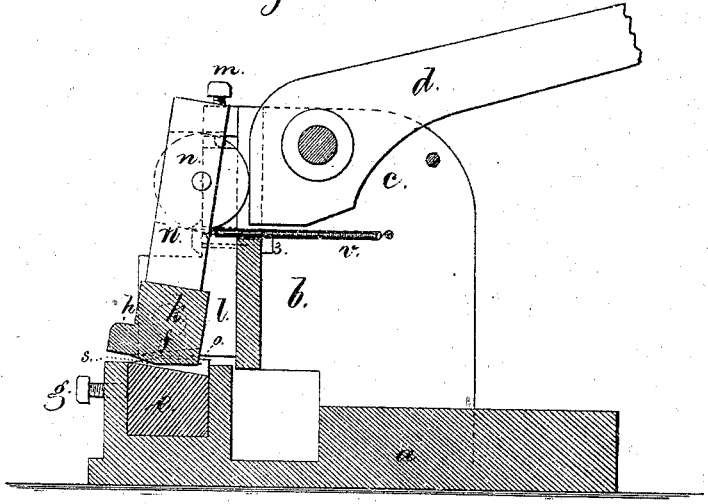

In the drawing, Figure 1 is an elevation of the said saw-set; and Fig. 2 a vertical cross-section of the said saw set.

The frame is made with a base, $a$, and vertical standard $b$, which standard $b$ is provided with a jaw, $c$, for the cam-lever $d$. The dies $e$ and $f$ are to act directly upon the saw and teeth; the die $e$ is set in a receptacle or longitudinal groove in the bed $a$, so as to be changeable; it is held by screws $g$. The die $f$ is in a stock, $h$, that has journals $k$ at its ends, supported in boxes $l$, that are held by bolts 3 in slots, and adjustable accurately by the screws $m$, so that the distance between the dies $e\,f$, when closed, corresponds to the thickness of the saw blade or plate. The surfaces of the dies $e$ and $f$ are divided transversely by alternate steps $o$ and depressions $s$, equal in width to the distance from the bottom of the space between two teeth to the bottom of the next space, so that a saw placed upon the die $e$ will have the alternate teeth resting upon the surfaces of the steps, and the intermediate teeth be over the depressions. The surfaces of the steps are at an inclination to the plain portion of the die. The die $f$ is made precisely the same as the die $e$, but the parts are positioned so that the steps of the die $f$ come above or opposite to the depressions in the die $e$. The cam-lever $d$ acts against the lever $n$ of the stock $h$ to swing said stock $h$ and die $f$; hence, when a saw is placed between the dies $e\,f$ and the lever $d$ moved, the surface of the die $f$ acts to bend the teeth by a motion that is from the base of the tooth toward the point as the die rolls in the bearings $l$; hence the bending action will not force the saw out from between the dies, but will tend to hold the same firmly between them, and bend the saw-teeth alternately up and down, and there will be a drawing action upon the teeth by the die $f$ that tends to bend the teeth gradually and back to the base of the tooth. The gages $t$ serve to determine the position of the saw relatively to the bending-dies; they are adjustable, and may take either the points of the teeth or the bottoms of the spaces. A connection, $v$, serves to raise the jaw or die $f$ to liberate the saw as the lever $d$ is lifted.

We claim as our invention—

The die $f$ in the stock $h$, and swinging in adjustable bearings, in combination with the die $e$, the surfaces of which dies are adapted to setting saw-teeth, so that the die $f$ will act with a drawing movement as it bends the teeth, substantially as set forth.

Signed by us this 22d day of August, 1872.

ALFRED BOYNTON.
        WILLIAM BOYNTON.

Witnesses:
  GEO. D. WALKER,
  GEO. T. PINCKNEY.